United States Patent [19]

Osato et al.

[11] Patent Number: 4,899,168

[45] Date of Patent: Feb. 6, 1990

[54] OPTICAL RECORDING MEDIUM

[75] Inventors: Yoichi Osato, Yokohama; Ichiro Saito, Kawasaki; Yoshio Takasu, Tama, all of Japan

[73] Assignee: Canon Kabushiki Kaisha, Tokyo, Japan

[21] Appl. No.: 236,306

[22] Filed: Aug. 25, 1988

Related U.S. Application Data

[60] Continuation of Ser. No. 946,622, Dec. 29, 1986, abandoned, which is a division of Ser. No. 749,116, Jun. 26, 1985, abandoned, which is a continuation of Ser. No. 563,585, Dec. 20, 1983, abandoned.

[30] Foreign Application Priority Data

Dec. 21, 1982 [JP] Japan .................................. 57-224384

[51] Int. Cl.$^4$ .............................................. G01D 9/00
[52] U.S. Cl. ....................................... 346/1.1; 428/65; 430/945; 369/284; 369/286; 369/288; 346/135.1
[58] Field of Search .......................... 428/65, 480, 913; 430/945, 270, 291, 271, 321; 369/284, 286, 288, 275; 346/135.1, 1.1

[56] References Cited

U.S. PATENT DOCUMENTS

| | | | |
|---|---|---|---|
| 4,214,249 | 7/1980 | Kasai et al. | 430/306 X |
| 4,268,575 | 5/1981 | Shinozaki et al. | 428/65 X |
| 4,291,119 | 9/1981 | Kido et al. | 430/348 |
| 4,383,029 | 5/1983 | Yamada et al. | 430/495 X |
| 4,499,178 | 2/1985 | Wada et al. | 430/495 |

*Primary Examiner*—Alexander S. Thomas
*Attorney, Agent, or Firm*—Fitzpatrick, Cella, Harper & Scinto

[57] ABSTRACT

An optical recording medium made up of a substrate and an electromagnetic radiation sensitive layer consisting essentially of a sulfur compound as a matrix and a substance (such as, for example, Te, Pb, Au, Sn, As, Bi, In, C) which is subjected to heat action from absorption of electromagnetic radiation and brings about optical changes by such heat action.

13 Claims, No Drawings

OPTICAL RECORDING MEDIUM

This application is a continuation of application Ser. No. 946,622 filed Dec. 29, 1986, now abandoned, which in turn is a division of application Ser. No. 749,116, filed June 26, 1985, now abandoned, which in turn is a continuation of application Ser. No. 563,585, filed Dec. 20, 1983, now abaondoned.

BACKGROUND OF THE INVENTION

1. Field of the Invention

This invention relates to an optical recording medium for recording therein various information with high density by means of laser beam, etc., and reproducing such recorded information from it. More particularly, the invention is concerned with an optical recording medium capable of effecting optical recording and reproduction of information with high density by means of laser beam, etc. having its optical wavelengths in the visible light and near-infrared regions and being of a low energy level.

2. Description of the Prior Art

In general, an optical disc is constructed with a substrate and a thin recording layer provided on the substrate, and has the capability of recording information with high density in the form of optically detectable minute pits of a size of, for example, approximately one micron, which are arranged in the form of spiral or concentric tracks. For writing information into this disc, the surface of the laser sensitive layer thereon is scanned by the laser beam, and the beam-irradiated surface alone has the pits formed therein, the pits being arranged on this optical disc in the form of spiral or concentric tracks.

The laser sensitive layer is capable of absorbing the laser energy to form therein optically detectable pits. For instance, in a heat mode recording system, the laser sensitive layer absorbs heat energy to form minute pits at the irradiated portion due to evaporation or deformation of the material constituting the layer. In another heat mode recording system, the optically detectable pits having a difference in the degree of oxidation caused by chemical changes, difference in the reflection factor, or difference in the optical density can be formed at the irradiated portion due to absorption of the laser energy into the laser sensitive layer.

The information recorded in this optical recording medium is detected by scanning the laser beam along the tracks, and reading optical changes between the portions where the pits have been formed and those where no pits have been formed.

As the recording medium for use in such recording and reproduction, there have so far been known metallic thin films such as aluminum vapor-deposited film, a bismuth thin film, a tellurium oxide thin film, those thin films using inorganic substances such as chalcogenite type amorphous glass film as the principal constituent and those thin films of organic substances such as plastic film containing therein dyes (or coloring matters).

However, in the heretofore known methods of forming the pits by the chemical changes as mentioned in the foregoing, various disadvantages inevitably result. The thus produced recording medium exhibits poor sensitivity of the recording medium low optional contrast between the pitted section and the unpitted section on the recording medium and lack of recorded information having high S/N ratio and instability in storage for the recording medium with the recorded information and other problems. On the other hand, a method of forming holes is able to produce the recording medium with high sensitivity and high S/N ratio, but the method has its own disadvantages such that the surface of the laser sensitive layer exposed to the atmosphere is subjected to oxidation under the environment of moisture-containing or oxidizing atmosphere and becomes deficient in its stability. With a view to removing such disadvantages as mentioned above, there have been proposed conventional methods to provide a protective layer on both upper and lower surfaces of the laser sensitive layer, or either of them. However, such protective layer causes decrease in the sensitivity and the S/N ratio of the recording medium.

SUMMARY OF THE INVENTION

In view of the foregoing deficiencies in the recording medium obtained by the conventional methods, it is an object of the present invention to provide an improved optical recording medium which is free from all the disadvantages as mentioned in the foregoing.

It is another object of the present invention to provide an optical recording medium with improved sensitivity and prominent changes in the optical characteristics as the result of the recording operations.

It is still another object of the present invention to provide an optical recording medium capable of maintaining stability in the recorded information with lapse of time after the recording operations.

According to one aspect of the present invention, there is provided an optical recording medium which comprises in combination: a substrate, and a thin film consisting essentially of a sulfur compound and a substance which absorbs electromagnetic radiation to bring about optical changes.

DETAILED DESCRIPTION OF PREFERRED EMBODIMENTS

In the following, the present invention will be described in detail with reference to preferred embodiments thereof.

The electromagnetic radiation sensitive film for use in the optical recording medium according to the present invention can be obtained by either of the following two ways, using substances which are susceptible to heat action by absorption of electro-magnetic radiation (such as, for instance, tellurium (Te), lead (Pb), gold (Au), tin (Sn), arsenic (As), bismuth (Bi), indium (In), carbon black, and so forth), and sulfur compounds (such as, for example, tin(II) sulfide (SnS), antimony(III) sulfide ($Sb_2S_3$), germanium(II) sulfide (GeS), arsenic sulfide ($As_2S_3$), tungsten(IV) sulfide ($WS_2$), aluminum sulfide ($Al_2S_3$), indium(III) sulfide ($In_2S_3$), silver(I) sulfide ($Ag_2S$), chromium(II) sulfide (CrS), cobalt(II) sulfide (CoS), tantalum(IV) sulfide ($TaS_2$), copper(I) sulfide ($Cu_2S$), lead(II) sulfide (PbS), bismuth(III) sulfide ($Bi_2S_3$), manganese (II) sulfide (MnS), molybdenum(IV) sulfide ($MoS_2$), and other metal sulfides, or poly-carbon sulfide $(CS)_n$.

In the first method the two species of substance are placed separately in an individual vapor-deposition boat, a vapor-deposition crucible, or an electron beam vapor-deposition crucible, followed by deposition of these substances on a substrate through the vacuum heating vapor-deposition, electron beam vapor-deposition, mixed vapor-deposition, or mixed sputtering method; or In the second method the abovementioned sulfur compound and substance which absorbs electromagnetic radiation to cause the optical changes are made into a mixed pellet by first mixing them, then co-melting the mixture under heat to form a mixed phase, and pelletizing the mixed material, after which the pellet is subjected to the vacuum heating vapor-deposition, electron beam vapor-deposition, or sputtering so as to deposit a layer on the substrate.

Of the abovementioned two methods, the vacuum vapor-deposition method is preferable, since the deposition operation is simple and the resulting reproducibility is satisfactory. This vacuum vapor-deposition should preferably be done under the vacuum degree of $5 \times 10^{-5}$ Torr or below, and at the vapor-deposition speed of from 0.1 to 50 Å/sec., or preferably, from 1 to 40 Å/sec.

The electromagnetic radiation sensitive film according to the present invention should preferably contain therein the substance which absorbs the above-mentioned electromagnetic radiation to bring about the optical changes in a range of from 20 to 70 mol %, and its thickness may range suitably from 300 Å to 5,000 Å.

While the optical recording medium of the present invention can be fabricated by forming the electromagnetic radiation sensitive film on the substrate to be used as a layer supporting member, there may also be provided various other auxiliary layers thereon. As an example, with a view to adjusting heat constant, a surface coating of an inorganic or an organic substance may be provided on the substrate surface. Further, a protective layer made of a transparent material may be provided on the electromagnetic radiation sensitive film. This protective layer is effective not only in preventing the mechanical damage to the electromagnetic radiation sensitive film from taking place, but also in providing a reflection preventive coating by forming it to an appropriate film thickness, hence it is effective in improving sensitivity. There may also be interposed a reflective layer between the electromagnetic radiation sensitive film and the substrate. The reflective layer may be in the form of a vapor-deposited layer or a laminated layer of a reflective metal such as aluminum, silver, chromium, and so forth. Furthermore, a pre-groove having functions of a track guide groove, an address designating groove, etc. may be formed in the optical recording medium.

According to preferred examples of the present invention, a coating layer made of a matrix of tin sulfide $SnS_{x1}$ ($0 < x1 < 1$) or antimony sulfide $SbS_{x2}$ ($0 < x2 \leq \frac{2}{3}$) containing therein at least one kind of metal selected from the group of tellurium (Te), lead (Pb), gold (Au), tin (Sn), and arsenic (As) can be used as the electromagnetic radiation sensitive film. In this case, the abovementioned metals should preferably be contained in the matrix consisting of tin sulfide or antimony sulfide in a range from 20 to 70 mol %. The pits representing the recorded information can be formed in this coating layer by irradiation from a short pulse light source such as, for example, a gallium-arsenic-aluminum semiconductor laser (oscillation wavelength of 820 nm), an argon gas laser (oscillation wavelength of 488 nm, 515 nm), a helium-neon gas laser (oscillation wavelength of 632.8 nm), and other lasers having the oscillation wavelengths of from visible light region to infrared region, various light emitting lamps like a xenon flash lamp, etc., or an infrared lamp; or by bringing a heater into contact with the coating layer. The pitted section on the electromagnetic radiation sensitive film has a different reflection factor from that of the unpitted section therein, so that this difference in the reflection factor can be read out through a photo-detector by scanning of these pitted and unpitted sections with a low output laser along the tracks, in which the pits were formed by the electromagnetic radiation scanning.

For the construction of the optical recording medium according to the present invention, the substrate used as the layer supporting member should preferably be transparent when the recording operation is done by impinging information recording light (electromagnetic radiation) onto the recording layer from the substrate side. As the light source for recording information into the recording medium, there may be used a short pulse light source such as the semiconductor laser, argon gas laser, helium-neon gas laser, other lasers having the oscillation wavelengths in the visible light region to the infrared region, various light emitting lamps like xenon flash lamp, etc., and others, as already mentioned in the foregoing. Accordingly, the transparent substrate for that purpose should preferably be such that, for increasing the sensitivity, it may have the transparency suited for the light wave characteristic of a desired light source. In this case, a transmission rate of approximately 90% and higher of the incident light may be taken as a yardstick for the transparency.

As the transparent substrate having adequate light transmission property for any kind of the above-mentioned light sources, there may be enumerated inorganic materials such as glass; polymers such as polyester, polypropylene, polycarbonate, polyvinyl chloride, polyamide, polystyrene, polymethyl methacrylate, and so forth; or modified polymers, copolymers, polymer blends of the abovementioned polymers, all being in the form of a film or a sheet. When the surface smoothness of the substrate per se is influential upon the S/N ratio of the recording signals as is the case with the video disc, etc., it is preferable to use a substrate, on the surface of which any of the abovementioned polymers has been uniformly coated by a spinner coating method, or others.

Polyester or polymethyl methacrylate in the film or sheet form is particularly preferred for use as the transparent substrate.

In case the recording operation is effected by impinging the information recording light onto the recording layer from the opposite side of the substrate, there may be used, as the substrate, a film or a sheet of the inorganic material or the polymers with a coloring matter (dye), a pigment, or a reinforcing agent being added thereto, or a metal sheet such as an aluminum alloy, etc., besides the above-mentioned transparent substrate.

The optical information recording medium according to the present invention has its remarkable effects to be mentioned in the following, in comparison with the recording medium for use in the system where minute holes are formed in the recording surface by irradiation of laser beam, or the recording medium for use in the system where minute pits are formed in the recording surface with the optical characteristics such as the reflection factor, light transmission rate, etc. being varied, both systems having been practiced conventionally.

(1) High sensitivity: the absorption efficiency of the laser sensitive thin film with respect to the laser beam for the recording is high, which makes it possible to effect the recording operation by irradiation of the helium-neon gas laser beam or the semiconductor laser beam having the energy density of 50 mJ/cm$^2$ or below.

(2) High reproduction efficiency: owing to this high reproduction efficiency, when the information recorded with the helium-neon gas laser beam, the semiconductor laser beam, etc. are to be reproduced, a difference ($\Delta T$) in the light transmittance between the initial unrecorded and recorded parts can be made 25% or higher, and a difference ($\Delta R$) in the reflection factor between them 15% or higher.

With a view to enabling those persons skilled in the art to readily put the present invention into practice, the following preferred embodiments are presented. It should, however, be noted that these examples are illustrative only and not restrictive, and that any changes and modifications may be made within the spirit and scope of the present invention as recited in the appended claims. The term "filling rate" as used in the following examples means a volume content of the added metal in the electromagnetic radiation sensitive film.

EXAMPLE 1

A disc-shaped substrate of polymethyl methacrylate and having a diameter of 30 cm and good surface smoothness manufactured by the cast method was placed in a vacuum-deposition vessel. The disc was so set that it could be rotated about the middle of the device. The vacuum deposition device had in its interior an electron beam vapor-deposition device with three boats for the vapor-deposition under heat and five crucibles arranged about the center shaft for rotation. Into the two boats out of the three, tin sulfide (SnS) and tellurium (Te) were placed in each of them. After the vapor-deposition vessel interior was brought to a vacuum degree of $2 \times 10^{-5}$ Torr, the rotational speed of the substrate was set at 50 rpm. Under these conditions, the vapor-deposition was carried out until the film thickness attained 3,000 Å, while the filling rate of tellurium was controlled to be 50%. The vapor-deposition speed in this case wa 1 Å/sec.

The thus fabricated recording medium was mounted on a turn-table. While rotating the turn-table by a motor at a rotational speed of 1,000 rpm, the surface of the recording medium was scanned along a track with the gallium-arsenic-aluminum semiconductor laser (oscillation wavelength of 820 nm) converged through an optical lens into a spot size of 1.0 micron, having a light source output of 15 mW, and with its pulse width modulated to 4 MHz.

When the surface of the recording medium as recorded was observed through an optical electron microscope, the pitted section thereon in an elliptical form having a minor diameter of approximately 1 micron was found to be brighter, i.e., higher in the reflection factor, than the unpitted section.

On the other hand, the same recording medium was subjected to measurement for its variations in the light transmission rate when it was heated for 20 minutes at a temperature of 200° C. under the vacuum condition. It was discovered that the optical changes took place in the recording medium.

Further, in order to measure the enduring stability of the recording medium with lapse of time after the recording operation, the above-mentioned recording medium with recorded information was left for 240 hours in under extreme circumstances at a temperature of 35° C. and a relative humidity of 95%, after which the surface of the recording medium was observed through the optical microscope, in the same manner as mentioned above. The pits having the same high reflection factor as that observed before the durability test were recognized. Furthermore, when the gallium-arsenic-aluminum semiconductor laser of a low output was impinged on the recording medium with recorded information therein and which had been subjected to the durability test to perform detection of the reflected light, there could be obtained wave forms having sufficiently high S/N ratio.

EXAMPLE 2

The optical recording medium was prepared in the same manner as in Example 1 above, with the exception that tellurium used for fabrication of the optical recording medium as described in the preceding Example 1 was replaced by indium (In).

The thus prepared recording medium was placed for 20 minutes under vacuum at a temperature of 200° C., and then measured for changes in its transmission rate. It was discovered that optical changes took place.

Also, when the recording medium prepared in this Example was scanned by the laser in the same manner as in Example 1 above, and then observed through the optical microscope, there could be recognized the pits having high reflection factor. Further, when the measurements for the enduring stability and the S/N ratio of the recording medium were conducted in the same manner as in Example 1 above, both were found to have attained satisfactory levels.

EXAMPLE 3

The optical recording medium was prepared in the same manner as in Example 1 above, with the exception that tellurium (Te) used for fabrication of the optical recording medium as described in the above Example 1 was replaced by tin (Sn).

The thus prepared recording medium was placed for 20 minutes under vacuum at a temperature of 200° C., and then measured for changes in its transmittance. It was discovered that optical changes had taken place.

Also, when the recording medium prepared in this Example was scanned by the laser in the same manner as in Example 1 above, and then observed through the optical microscope, there could be recognized the pits having high reflection factor. Further, when the measurements for the enduring stability and the S/N ratio of the recording medium were conducted in the same manner as in Example 1 above, both were found to have attained satisfactory levels.

EXAMPLE 4

The optical recording medium was prepared in the same manner as in Example 1 above, with the exception that tellurium (Te) used for fabrication of the optical recording medium as described in the above Example 1 was replaced by gold (Au).

The thus fabricated recording medium was placed for 15 minutes under vacuum at a temperature of 300° C., and then measured for changes in its reflection factor. It was discovered that the reflection factor changed before and after heating.

Also, when the recording medium prepared in this Example was scanned by the laser in the same manner as in Example 1 above, and then observed through the optical microscope, there could be recognized the pits having high reflection factor. Further, when the measurements for the enduring stability and the S/N ratio of the recording medium were conducted in the same manner as in Example 1 above, both were found to have attained satisfactory levels. EXAMPLE 5

The optical recording medium was prepared in the same manner as in Example 1 above, with the exception that tin sulfide (SnS) used for fabrication of the optical recording medium as described in the above Example 1 was replaced by antimony sulfide ($Sb_2S_3$).

The thus prepared recording medium was scanned by the laser in the same manner as in Example 1 above, and then observed through the optical microscope. There could be recognized the pits having high reflection factor. Further, when the measurements for the enduring stability and the S/N ratio of the recording medium were conducted in the same manner as in Example 1 above, both were found to have attained satisfactory levels.

What we claim is:

1. A method for preparing a laser beam-readable optical recording medium comprising:
    providing a medium including a substrate having thereon a thin film containing a sulfur compound and a substance capable of undergoing a change in reflectivity through the absorption of electromagnetic radiation; and
    irradiating said medium with an electromagnetic radiation beam which is sufficient to form on said thin film, pitted sections having higher reflectivity than unpitted sections of said medium surrounding said pitted sections but is insufficient to cause depressions or to create holes in said thin film.

2. The method according to claim 1, wherein said thin film contains said substance capable of undergoing a change in reflectivity in a matrix of said sulfur compound.

3. The method according to claim 1, wherein said thin film is a coated film comprising a substance capable of undergoing a change in reflectivity through absorption of electromagnetic radiation contained in a matrix of sulfur compound.

4. The method according to claim 1, wherein the substance capable of undergoing a change in reflectivity through absorption of electromagnetic radiation is contained in an amount ranging from 20 to 70 mole percent.

5. The method according to claim 1, wherein said sulfur compound is at least one kind selected from the group consisting of tin (II) sulfide, antimony (III) sulfide, germanium (II) sulfide, arsenic sulfide, tungsten (IV) sulfide, aluminum sulfide, indium (III) sulfide, silver (I) sulfide, chromium (II) sulfide, cobalt (II) sulfide, tantalum (IV) sulfide, copper (I) sulfide, lead (II) sulfide, bismuth (III) sulfide, manganese (II) sulfide, molybdenum (IV) sulfide, and carbon sulfide polymers.

6. The method according to claim 5, wherein said sulfur compound is a metal sulfide represented by $SnS_{x1}$ ($0 < x1 \leq 1$).

7. The method according to claim 5, wherein said sulfur compound is a metal sulfide represented by $InS_2$ ($0 < x2 \leq \frac{2}{3}$).

8. The method according to claim 1, wherein said substance capable of undergoing a change in reflectivity through the absorption of electromagnetic radiation is one which brings about the change in reflectivity by action of heat.

9. The method according to claim 8, wherein said substance capable of undergoing a change in reflectivity through the absorption of electromagnetic radiation is at least one kind selected from the group consisting of tellurium (Te), lead (Pb), gold (Au), tin (Sn), arsenic (As), bismuth (Bi), indium (In), and carbon (C).

10. The method according to claim 1, further comprising providing a protective film layer on said film containing said sulfur compound and said substance capable of undergoing a change in reflectivity through the absorption of electromagnetic radiation;

11. The method according to claim 1, further comprising providing a reflection preventive film on said thin film containing said sulfur compound and said substance capable of undergoing a change in reflectivity through the absorption of electromagnetic radiation.

12. The method according to claim 1, further comprising interposing a reflective layer between said substrate and said thin film containing said sulfur compound and said substance capable of undergoing change in reflectivity through the absorption of electromagnetic radiation.

13. The method according to claim 1, wherein said substrate is made of polyester or polymethyl methacrylate.

* * * * *

UNITED STATES PATENT AND TRADEMARK OFFICE
CERTIFICATE OF CORRECTION

PATENT NO. : 4,899,168
DATED : February 6, 1990
INVENTOR(S) : YOICHI OSATO, ET AL.

It is certified that error appears in the above-identified patent and that said Letters Patent is hereby corrected as shown below:

COLUMN 1

Line 9, "abaondoned." should read --abandoned.--.
    Line 65, "medium" should read --medium,--.
    Line 67, "medium" should read --medium,--.

COLUMN 5

Line 41, "wa" should read --was--.

COLUMN 7

Line 4, "EXAMPLE 5" should be a heading.
    Line 42, "sulfur compound." should read
        --said sulfur compound.--.

Signed and Sealed this

Twentieth Day of August, 1991

Attest:

HARRY F. MANBECK, JR.

*Attesting Officer*  *Commissioner of Patents and Trademarks*